United States Patent [19]
Horner et al.

[11] Patent Number: 5,885,489
[45] Date of Patent: Mar. 23, 1999

[54] PACKING ELEMENTS

[75] Inventors: Gerald V. Horner, Market Drayton; Richard George Burgess, Stafford, both of United Kingdom

[73] Assignee: ETA Process Plant Limited, United Kingdom

[21] Appl. No.: 835,236

[22] Filed: Apr. 7, 1997

Related U.S. Application Data

[63] Continuation-in-part of Ser. No. 432,179, Jul. 17, 1995, abandoned.

[30] Foreign Application Priority Data

Nov. 3, 1992 [GB] United Kingdom ................ 9222998.2
Nov. 3, 1993 [WO] WIPO ..................... PCT/GB93/02257

[51] Int. Cl.$^6$ ................................................. B01F 3/04
[52] U.S. Cl. ..................................... 261/94; 261/DIG. 72
[58] Field of Search ............................... 261/94, DIG. 72

[56] References Cited

U.S. PATENT DOCUMENTS 4,275,019  6/1981  Bednarski .
4,277,425  7/1981  Leva .......................................... 261/94
4,376,081  3/1983  Leva .

FOREIGN PATENT DOCUMENTS 0 459 686 A2  12/1991  European Pat. Off. .
1 439 745  6/1976  United Kingdom .
1 573 745  8/1980  United Kingdom .
2 257 603  1/1993  United Kingdom .
WO 85/05287  12/1985  WIPO .
WO 93/25029  12/1993  WIPO .

OTHER PUBLICATIONS

WO 85/05287, McKeown Dec. 5,1985.
The Oil and Gas Journal; May 22,1967; p. 12; Independent Tests Prove Pall Rings have lowest pressure drop.
Tower Packings, US Stoneware Bulletin TP 54, 1957, "Pall Rings" (p.10), 261–94.

*Primary Examiner*—C. Scott Bushey
*Attorney, Agent, or Firm*—Kirschten et al.

[57] ABSTRACT

A packing element for fluid-fluid contact apparatus is of generally tubular form, having a cylindrical wall in which two rows of apertures are formed. The first of the rows includes a plurality of apertures formed circumferentially in the wall, and the second of the rows, longitudinally spaced from the first row, includes a second plurality of apertures distributed circumferentially around the wall. First and second pluralities of tongues associated with the apertures respectively extend inwardly generally towards the longitudinal axis of the element, the tongues being provided in two different lengths. The packing element is preferably formed from strip metal, and the apertures are formed by depression of the tongue from the plane of the strip, prior to curving of the strip into cylindrical form.

12 Claims, 4 Drawing Sheets

PACKING ELEMENTS

This application is a CIP of Ser. No. 08/432,179, filed Jul. 17, 1995, now abandoned.

BACKGROUND OF THE INVENTION

This invention relates to packing elements for use in fluid-fluid contact apparatus. The invention also relates to fluid-fluid contact apparatus comprising such elements and to a method of providing fluid-fluid contact utilising such elements or apparatus.

Typically, fluid-fluid contact apparatus is in the form of a tower or column or the like and comprises one or more beds formed from a plurality of packing elements, which in many cases are dumped therein in a substantially random manner.

In typical operation, the fluids to be brought into contact are introduced into the apparatus and the surfaces of the packing elements afford a substantial area on which contact between the fluids may occur.

Thus, for example, where the fluids comprise a liquid typically introduced at or near the top of the bed, and a gas typically introduced at or near the bottom of the bed, the liquid forms a thin film on the surfaces of the elements, which film presents a large contact area, in relation to its volume, to the gas permeating the bed from below, such that mass transfer is promoted between the liquid and the gas. Alternatively or additionally, for example, the liquid may be afforded by a or said gas which has condensed on the packing elements.

SUMMARY OF THE INVENTION

It is an object of the invention to provide new and improved such packing elements for use in fluid-fluid contact apparatus and methods.

According to the present invention, there is provided a packing element for use in fluid-fluid contact apparatus, the packing element being of open-ended generally tubular form and comprising a generally cylindrical wall, a plurality of apertures formed in the wall at respective locations distributed circumferentially around the wall, and a plurality of tongues associated with the apertures and extending inwardly generally towards a longitudinal axis of the element, said tongues being provided in at least two different sizes.

In this manner, a more uniform distribution of fluid flow may be achieved through the interior of the element, in terms of the packing element surface area, or the number of tongue extremities, encountered by said flow through different regions of said interior.

It is to be understood that the packing element in transverse cross-section may be of closed-loop form, or may be of discontinuous form such as by virtue of comprising a curved strip the ends of which abut each other or lie generally close to each other, without being secured together.

The tongues may be provided in at least a first size and a second size, the tongues of the first size being larger than the tongues of the second size, and the tongues of the first size being herein referred to as "large tongues", and the tongues of the second size being herein referred to as "small tongues".

The tongues may be arranged such that at locations generally diametrically opposite each large tongue (as herein defined) and its associated aperture, there is/are provided one or more small tongues (as herein defined) and its/their associated aperture(s).

Alternatively or additionally, the tongues may be arranged such that at locations intermediate those at which respective large tongues (as herein defined) and their associated apertures are provided, there are provided one or more small tongues (as herein defined) and its/their associated apertures.

In relation to either or both of said arrangements, preferably the large and small tongues and said apertures are arranged such that if the packing element is viewed from generally any direction radial to said axis, generally at least one direct line of sight completely through the element is obtained by way of said apertures.

In this manner, fluid flow is promoted, through the elements, in directions generally radial to their axes, thereby increasing fluid through-put in such radial directions and/or reducing the fluid pressure required to obtain a desired through-put in said radial directions.

At each such opposite and/or intermediate location, there may be provided two or more small tongues.

By providing two or more such small tongues rather than, for example, one large tongue, the number of tongue extremities is increased, which has been found to increase fluid-fluid transfer efficiency. Furthermore achievement of said direct lines of sight through the element is facilitated.

Each large tongue may extend from a circumferential end of the respective aperture associated therewith.

Where two small tongues are provided in circumferential succession on said wall, preferably, they extend from circumferential ends of respective distinct apertures.

Preferably, in relation to its associated aperture, each of said tongues extends from the circumferential end of the aperture having the lesser azimuthal coordinate.

Alternatively, for example, each of said tongues, in relation to its associated aperture, may extend from the circumferential end of the aperture having the greater azimuthal coordinate.

It will be appreciated that the direction of increasing azimuthal coordinate may be decided arbitrarily.

Preferably, at least the large tongues are generally arcuate, arranged such that their convex surfaces lie closest to their respective associated apertures.

Preferably the ratio of the lengths of the larger tongues to that of the smaller tongues lies in the range 2:1 and 4:1, and preferably the larger tongues are about three times the length of the smaller tongues.

Preferably, at least the large tongues taper towards their free ends.

Preferably, the apertures occupy a fraction of between about 25% and about 45% of the total surface area of the element.

In a preferred embodiment, the packing element is provided with two rows of said apertures and tongues, at different longitudinal positions in the cylindrical wall.

In said preferred embodiment, if desired, in each of said rows the tongues may extend from the circumferential ends of the apertures having the lesser azimuthal coordinates, or alternatively in each of said rows, the tongues may extend from the ends of the apertures having the greater azimuthal coordinates.

Preferably however, in one of said rows, the tongues extend from the circumferential ends of the apertures having the lesser azimuthal coordinates, while in the other of said rows the tongues extend from the circumferential ends of the apertures having the greater azimuthal coordinates.

In relation to the invention generally, one or both longitudinal ends of the element may be formed with outwardly directed flanges.

Any packing element in accordance with the invention may be moulded from plastics material if desired. Alternatively, the packing element may for example be formed from an elongate metal strip, the tongues and apertures being formed therein by a stamping and/or pressing operation, and the strip being subjected to a bending operation to afford said cylindrical wall.

The invention also provides fluid-fluid contact apparatus comprising one more packing elements in accordance with the invention.

The invention further provides a method of providing fluid-fluid contact utilising fluid-fluid contact apparatus in accordance with the invention or one or more packing elements in accordance with the invention.

BRIEF DESCRIPTION OF THE DRAWINGS

A preferred embodiment of the invention will now be described, by way of example only, with reference to the accompanying drawings, in which.

DETAILED DESCRIPTION OF THE PREFERRED EMBODIMENTS

Figure 1:
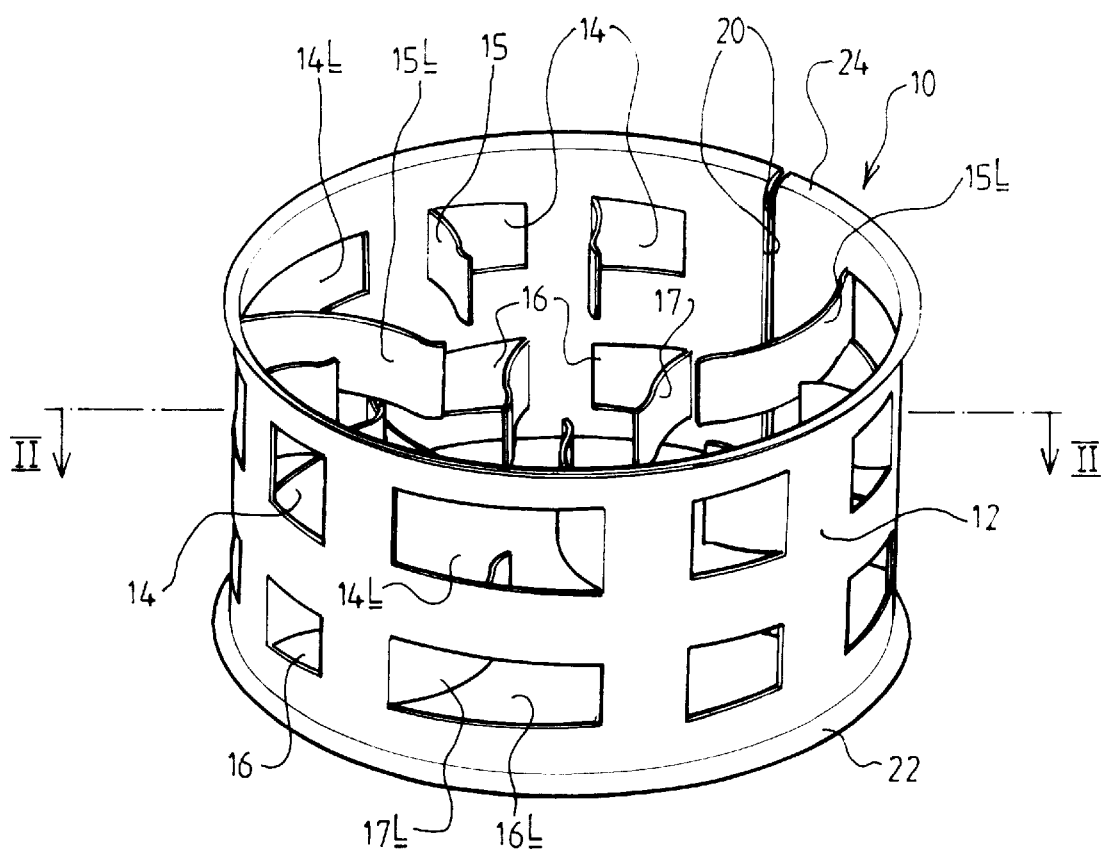
FIG. 1 is a perspective view of a preferred packing element embodying the invention.

Referring to the drawings, there is illustrated a packing element 10 which is a preferred embodiment of the invention. The packing element 10 is for use in fluid-fluid contact apparatus, the general principles of operation of such apparatus being described in the introductory part of this specification.

The packing element 10 is of open-ended generally tubular form and comprises a generally cylindrical wall 12 in which two rows of apertures are formed. The first of said rows comprises a first plurality of apertures 14, 14L formed in the wall at respective locations distributed circumferentially around the wall, and the second of said rows, longitudinally spaced from the first row, comprises a second plurality of apertures 16, 16L formed in the wall and distributed circumferentially around the wall. First and second pluralities of tongues 15, 15L, 17, 17L associated with the apertures 14, 14L, 16 16L respectively extend inwardly generally towards the longitudinal axis X of the element, said tongues being provided in two different sizes and being classified as "large" or "small" tongues according to their relative lengths.

The packing element 10 is of discontinuous form, in that it comprises a curved strip the ends 20 of which lie generally close to each other, without abutting each other and without being secured together, but the separation of said ends of the strip may generally be small compared with the diameter of the element 10.

Figure 2:
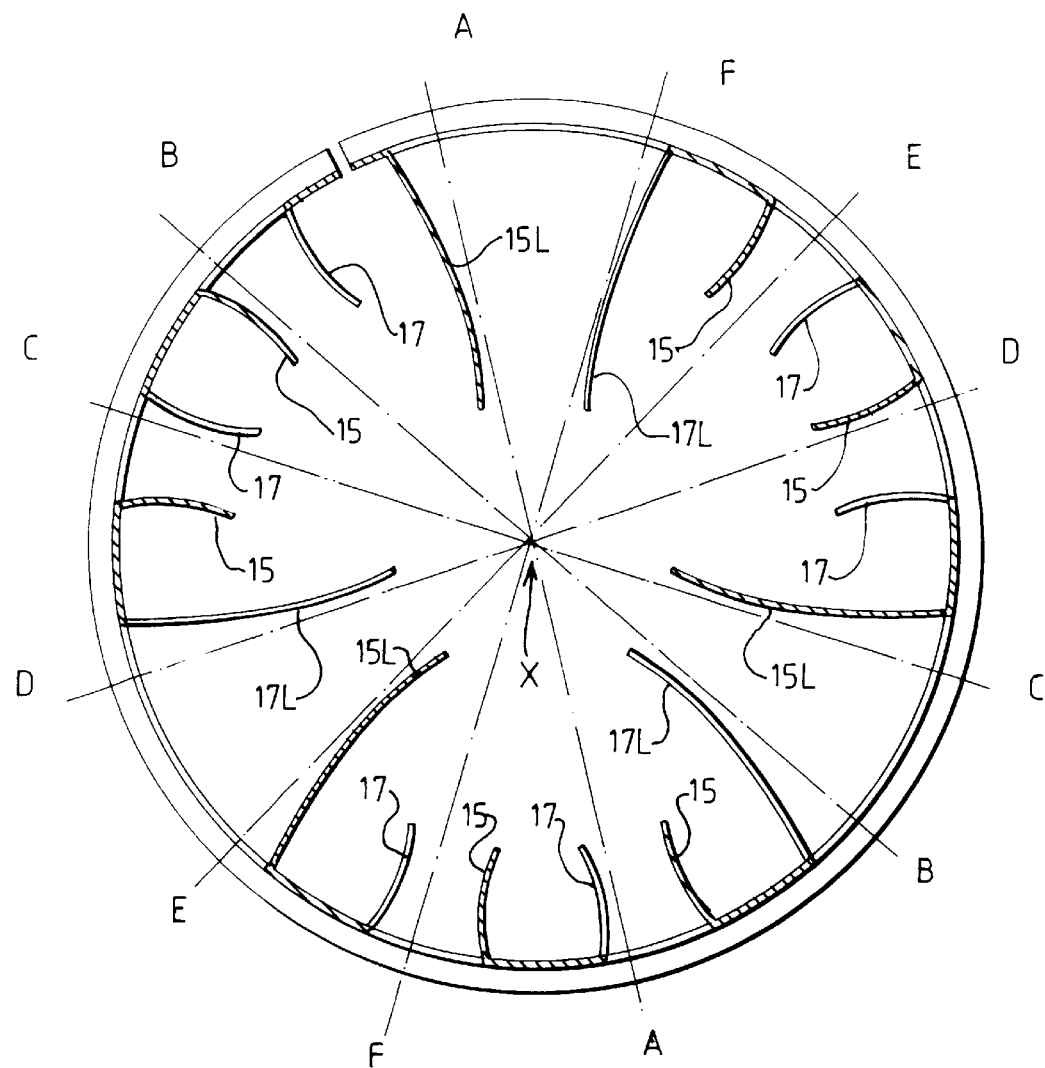
FIG. 2 is a cross-sectional plan view of the packing element of FIG. 1 on the line II—II of FIG. 1, to an enlarged scale.

As may be seen particularly from FIG. 2, in each row, the tongues are arranged such that at locations in the same row generally diametrically opposite each large tongue and its associated aperture there are provided one or more, in this example two, small tongues and their associated apertures.

It will also be appreciated from the drawings that the arrangement of the tongues in each row is such that at locations intermediate those at which respective large tongues and their associated apertures are provided, there are provided one or more, in this example two, small tongues and their associated apertures.

Each large tongue 15L, 17L extends from a circumferential end of the aperture 14L, 16L associated therewith. In this example, each small tongue 15, 17 extends from a circumferential end of a respective distinct aperture 14, 16 associated therewith.

In terms of azimuthal coordinates in relation to the axis of the packing element, treating the azimuthal coordinate as increasing in a clockwise sense as viewed in FIG. 2, it will be seen that in the first row of tongues and apertures, the tongues 15, 15L extend from the respective circumferential ends of the apertures 14, 14L having the lesser azimuthal coordinates, whereas in the second row the tongues 17, 17 L extend from the circumferential ends of the apertures 16, 16L having the greater azimuthal coordinates.

In the packing element 10 illustrated, the large tongues are arcuate and the convex surfaces of the large tongues lie closest to the respective associated apertures.

It will be appreciated that the tongues in evolved form would substantially correspond in shape to their associated apertures. In this example, the large tongues are approximately three times the length of the short tongues.

The large tongues, and to some extent also the small tongues, taper towards their free ends.

The edges of the element 10, at its longitudinal ends, are formed with respective outwardly directed generally circular flanges 22 and 24.

Figure 4:
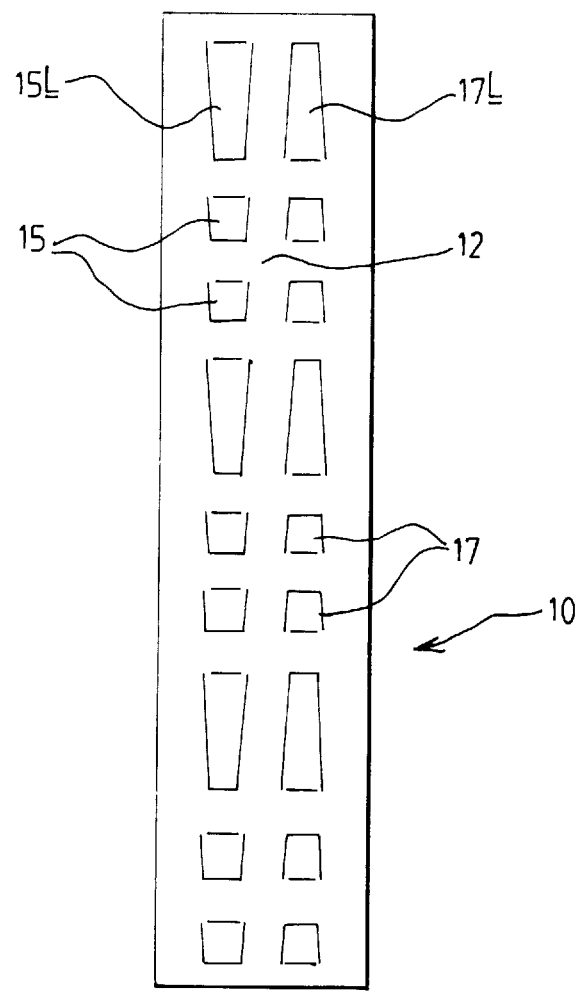
FIG. 4 illustrates in plan view a blank from which said preferred packing element may be formed, to a reduced scale.

Whilst the element 10 could if desired be moulded from plastics material, in the example illustrated, the element 10 is formed from an elongated metal strip, shown in FIG. 4, the tongues and apertures being formed therein by a stamping and/or pressing operation, and the strip then being subjected to a bending operation to afford said cylindrical wall. Said flanges are formed prior to said bending.

Figure 3:
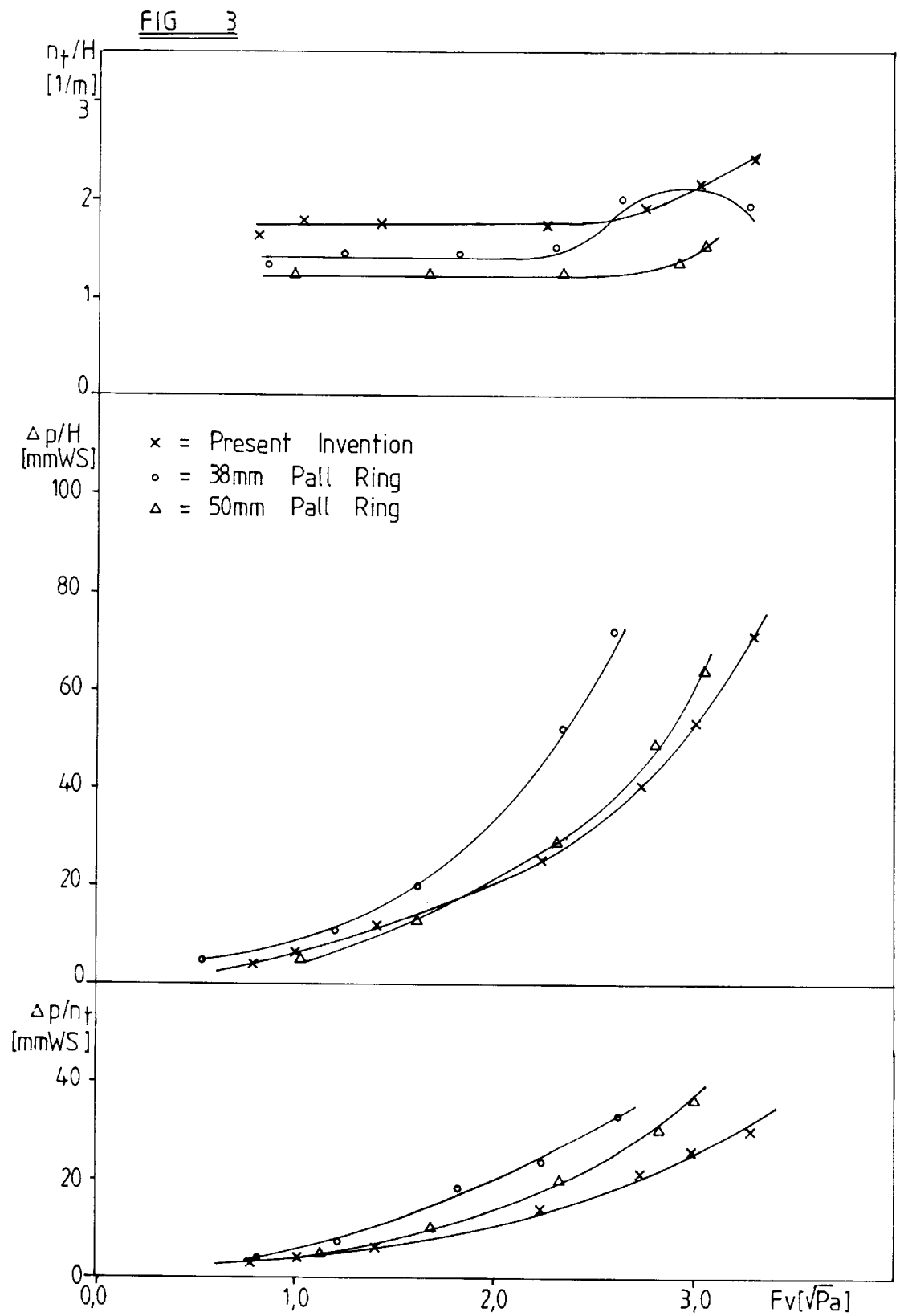
FIG. 3 illustrates graphically test results for the packing element of FIGS. 1 and 2, in comparison with two conventional packing elements.

Referring next to FIG. 3 of the drawings, in tests of an example of the element 10 in accordance with the present invention, having a diameter of approximately 50 mm and a height of approximately 20 mm, in comparison with conventional "Pall-ring" type packing elements (which have tongues which are all identical to each other in shape and length) of 38 mm and 50 mm diameter respectively, the results illustrated were obtained.

In chemical engineering terms, a process may be regarded as requiring a number of ideal steps. In practice, no real system is ideal, and a greater number of real steps will be required, but for each metre of column height it is possible to express the effect achieved in terms of the number of ideal steps ("theoretical stages") to which the effect corresponds.

In the upper graph of FIG. 3, the vertical axis represents the efficiency of the elements, the quantity $n_t/H$ being a measure of the number of theoretical stages per metre of product height, plotted against gas through-put $F_v$, (i.e. capacity) on the horizonal axis. From the flat portions of these curves, we believe that the packing element 10 is about 40% more efficient than a 50 mm Pall-ring and about 22% more efficient than a 38 mm Pall-ring.

The middle graph of FIG. 3 plots a quantity $\Delta p/H$ representing pressure drop per metre of product height, against gas through-put, and it is to be understood that the lower the pressure drop so indicated at any given through-put the less energy is required, and for any given pressure drop a higher through-put read from the graphs represents a greater capacity. From these results, our element 10 has approximately a 26% higher capacity than a 38 mm Pall-ring and marginally more capacity than a 50 mm Pall-ring.

The lower graph of FIG. 3 is a combination of the upper and middle graphs, in that the vertical axis now represents pressure drop per unit of efficiency. Hence, our element 10 has approximately 50% lower pressure drop per unit of efficiency than a 38 mm Pall-ring and approximately 30% lower pressure drop per unit of efficiency than a 50 mm Pall-ring.

In essence, a reduction in pressure drop for a given through-put means that less pressure difference, and hence less power, is required to maintain that through-put (i.e. flow rate) through fluid-fluid contact apparatus containing the packing element, so that the efficiency of the apparatus is therefore greater.

It is believed that by the careful selection of the size and arrangement of the tongues and apertures illustrated, the element 10 provides for fluid flow through the element generally parallel to the axis, and also in a direction generally transverse to the axis. With particular regard to the latter, as will be appreciated from the lines A—A to F—F indicated in FIG. 2 by way of illustration, the arrangement of the tongues and said apertures in the element 10 is such that if either row of the packing element 10 is viewed from generally any direction generally radial to its longitudinal axis, generally at least one direct line of sight completely through the element is obtained by way of apertures of that row lying on the near side and the far side of the element respectively, thereby promoting flow of fluid through the element 10 in said generally radial directions, to increase efficiency.

By utilising tongues of different lengths, a more uniform distribution of fluid flow through the element in a direction generally parallel to the axis is achieved, in terms of the packing element surface area, or the number of tongue extremities, encountered by said flow through different regions of the interior.

In the preferred packing element 10 illustrated, preferred lengths of the tongues are determined by taking a geometrical figure of size and shape corresponding to the interior of the element as seen in plan view, and dividing the interior of said figure into a plurality of concentric regions corresponding in number to the number of different tongue lengths, and such that the areas of said regions are in proportion to the number of tongues required to have their extremities in the respective regions. Said regions are then divided into sectors of equal area, corresponding in number to the number of tongue extremities required in each region, and the centroid (centre of area) of each such sector is then determined, the radial coordinate of the thus determined centroid being the radial coordinate required for the extremity of the tongue concerned.

The above determination is carried out, separately, for the or each row of tongues.

In this manner, firstly the extremities of the respective tongues may be regarded as having effect on substantially equal areas of said interior, and secondly said regions may be regarded as being served equally, in terms of the number of tongues per unit area.

It will be appreciated that the above determination is a determination of the radial coordinates of the tongue extremities, and that their azimuthal coordinates may, for example, be as illustrated.

By providing two or more small tongues at the locations at which small tongues are provided, the number of tongue extremities is increased which has been found to increase fluid-fluid transfer efficiency, effectively by providing a significant increase in the number of "drip points" which enhances the fluid distribution and re-distribution properties of the element.

Where a packing element lies with its axis X disposed horizontally, each tongue may be regarded as providing two drip points, at the respective corners of the extremity of the tongue, although in general where the packing elements are orientated at random, each tongue provides one drip point at the lower corner of its extremity.

Provision of the outwardly facing flanges 22 and 24 significantly increases the mechanical strength of the element whilst at the same time helping to prevent the fluids from simply flowing past the outside face of the element without significant contact.

In the element 10 illustrated, the tongues (or apertures) occupy an approximately 28% fraction of the total surface area of the element 10, said 28% lying within a preferred range of about 25% to about 45% for this fraction.

In the element 10 illustrated, the height of the element is preferably between 30% and 60%, preferably about 50% of its diameter, the length of the long tongues is preferably between 25% and 40% of said diameter, preferably between 30% and 35%, and the length of the short tongues is preferably between 8% and 13% of said diameter, preferably between 10% and 12%. The slot height (i.e. the extent of the slots in a direction parallel to the axis) is preferably between 20% and 30%, preferably about 25% of the height of the element and the axial separation of the slots is between 60% and 75% of their height. In a horizontal direction, the width of the solid portions between successive slots is in general approximately the same as the slot height.

It will be noted that the apertures 14L and 16L are aligned so as to occupy common azimuthal positions, and that the apertures 14 and 16 are aligned so as to occupy common azimuthal positions, and that, when viewed along the axis, tongues are arranged alternately from the top row and the bottom row around the axis.

It will be appreciated that if desired, a number of rows other than two may be utilised, and a packing element comprising only one such row will expressly remain within the scope of the invention.

It will be appreciated that if desired, the ends of the strip could abut each other or be secured together, and that when plastics moulded, the element could be in the form of a one-piece closed loop if desired.

It will be appreciated that any of the tongues, especially the small tongues, could be provided at opposite circumferential ends of common, larger apertures if desired, and that the tongues need not extend from the same circumferential ends of the apertures throughout any given row, and that in multiple row elements, if desired, the tongues in two or more rows could alternatively extend from the same circumferential ends of the associated apertures.

Whilst the small tongues illustrated are slightly arcuate, they could be straight or wavy form if desired.

Although the element 10 is provided with out-turned flanges at both ends, if desired such a flange could be provided only at one end, or such flanges could be omitted altogether.

Whilst the element 10 illustrated has a diameter to height ratio of approximately 2:1, other diameter-to-height ratios are of course possible, such as for example any diameter-to-height ratio in the range from approximately 3:1 to approximately 1:1.

The tongues may be provided in more than two different sizes if desired.

It will be appreciated that amongst the tongues of any given nominal size, some variation in actual tongue size may occur.

The features disclosed in the foregoing description, or the following claims, or the accompanying drawings, expressed in their specific forms or in terms of a means for performing the disclosed function, or a method or process for attaining the disclosed result, as appropriate may, separately or in any combination of such features, be utilised for realising the invention in diverse forms thereof.

In the preferred embodiment, the tongues are arranged in accordance with the following description.

Considering the ring in plan view (FIG. 2), the area of the circle is divided into concentric regions corresponding to the number of different sizes of tongues. In the preferred embodiment, where there are tongues of two different sizes, the circle is divided into two, an inner circular region and an annular outer region.

The position of this dividing line is such that the ratio of the area of the regions is equal to the ratio of the number of tongues of that length, e.g., in the preferred embodiment, where there are six shorter tongues and three longer tongues, the ratio of the area of the outer region to the area of the inner region is 2:1.

Each region is divided into sectors, the number of which is equal to the number of tongues of the associated length. Thus, in the preferred embodiment, the outer region is divided into six sectors, while the inner region is divided into three sectors.

Each tongue extends from the circumference to the center of the area of one of the sectors.

We claim:

1. In an improved packing element for use in fluid-fluid contact apparatus, the packing element being of open-ended generally tubular form and comprising a generally cylindrical wall, a plurality of apertures formed in the wall at respective locations distributed circumferentially around the wall, and a plurality of tongues associated with the apertures and extending inwardly generally towards a longitudinal axis of the element, said tongues being provided in at least two different larger and smaller sizes; the improvement being characterized in that the tongues and apertures lie in the same diametral plane and are arranged such that if the packing element is viewed from generally any direction radial to said axis, generally at least one direct line of sight completely through the element is obtained by way of said apertures, and in that the tongues are arranged such that at locations generally diametrically opposite each large tongue and its associated aperture, at least one small tongue and its associated aperture are provided.

2. The improvement according to claim 1, wherein the tongues are arranged such that at locations intermediate those at which respective large tongues and their associated apertures are provided, at least one small tongue and its associated aperture are provided.

3. The improvement according to claim 1, wherein at each said location, there is provided at least two small tongues.

4. The improvement according to claim 3, wherein, when two small tongues are provided in circumferential succession on said wall, they extend from circumferential ends of respective distinct apertures.

5. The improvement according to claim 1, wherein the tongues are elongate, and the ratio of the lengths of the larger tongues to that of the smaller tongues lies in the range 2:1 and 4:1.

6. The improvement according to claim 1, wherein the apertures occupy a fraction of between 25% to about 45% of the total surface area of the element.

7. The improvement according to claim 1, wherein there are provided two rows of said apertures and tongues, at different longitudinal positions on the cylindrical wall.

8. The improvement according to claim 1, wherein the cylindrical wall and the tongues are molded from plastics material.

9. The improvement according to claim 7, wherein the tongues of one row are curved in one circumferential direction about said axis, and where the tongues of the other row are curved in an opposite circumferential direction about said axis.

10. The improvement according to claim 9, wherein the tongues of said one row do not overlap the tongues of said other row.

11. In an improved packing element for use in fluid-fluid contact apparatus, the packing element being of open-ended generally tubular form and comprising a generally cylindrical wall, a plurality of apertures formed in the wall at respective locations distributed circumferentially around the wall, and a plurality of tongues associated with the apertures and extending inwardly generally towards a longitudinal axis of the element, said tongues being provided in at least two different larger and smaller sizes; the improvement being characterized in that:

a) the tongues lie in the same diametral plane, b) the larger tongues each terminate at a point on an inner circumferential line, and c) the shorter tongues each terminate at a point on an outer circumferential line, the locations of said points being determined by the number of the tongues, and by the number of the different sizes.

12. The improvement according to claim 11, wherein, considering the tubular element in plan view, the area of the circle provided by the tubular element is divided into concentric regions corresponding to the number of the different sizes of the tongues, and wherein the ratio of the area of the regions is equal to the ratio of the number of the tongues of each length, each of the regions being divided into sectors, the number of which is equal to the number of the tongues of the associated length, each of the tongues extending from the circumference of the circle to the center of one of the sectors.

* * * * *